(12) United States Patent
Reuss

(10) Patent No.: US 8,642,962 B2
(45) Date of Patent: Feb. 4, 2014

(54) DUAL NARROW-BROAD FOCUS SENSING OF PROXIMITY

(75) Inventor: Edward Reuss, Santa Cruz, CA (US)

(73) Assignee: Plantronics, Inc., Santa Cruz, CA (US)

( * ) Notice: Subject to any disclaimer, the term of this patent is extended or adjusted under 35 U.S.C. 154(b) by 339 days.

(21) Appl. No.: 13/069,061

(22) Filed: Mar. 22, 2011

(65) Prior Publication Data

US 2012/0242978 A1    Sep. 27, 2012

(51) Int. Cl.
*G01J 5/00*    (2006.01)

(52) U.S. Cl.
USPC .......................... 250/338.1; 356/41; 356/624

(58) Field of Classification Search
USPC .................. 250/338.1; 356/51, 624
See application file for complete search history.

(56) References Cited

U.S. PATENT DOCUMENTS

| | | | |
|---|---|---|---|
| 2003/0085870 A1* | 5/2003 | Hinckley | 345/156 |
| 2006/0106309 A1* | 5/2006 | Liu | 600/447 |
| 2010/0066821 A1 | 3/2010 | Rosener et al. | |
| 2010/0133436 A1 | 6/2010 | Rosener | |
| 2011/0316847 A1* | 12/2011 | Cheng | 345/419 |

* cited by examiner

*Primary Examiner* — David Porta
*Assistant Examiner* — Gisselle Gutierrez
(74) *Attorney, Agent, or Firm* — Thomas L. Ewing

(57) ABSTRACT

A proximity detection system is described among devices in a unified communications network. A narrow beam LED and a diffuse beam LED, both located near a first object, such as a computer monitor, provide a light illumination pattern detected by a narrow beam light detector and a broad beam light detector, both located near a second device, such as a headset. A processor calculates the ratio of measured intensity from the narrow beam LED compared to the broad beam LED as measured by the broad beam detector to provide an estimate for how far off axis the second object (e.g., a user of the headset) is with respect to the centerline in front of the second object (e.g., the computer monitor). The processor also calculates the ratio of measured intensity of the narrow IR beam detector to the broad IR beam detector to provide an estimate of the second object's orientation (e.g., the headset user's head) with respect to the first object to determine if the second object is facing the first object.

27 Claims, 8 Drawing Sheets

US 8,642,962 B2

DUAL NARROW-BROAD FOCUS SENSING OF PROXIMITY

FIELD

Embodiments of the invention relate to systems and methods for communications among the devices in a network. More particularly, embodiments of the invention relate to systems and methods configured to sense information about a headset wearer and/or glasses wearer, with some embodiments more specifically configured to sense the wearer's proximity to an object, such as a computer display, and signal that information to an appropriate management system, such as a unified communication presence management system.

BACKGROUND

Unified communications represents an important component of productivity in contemporary business culture, and its success from company to company can serve as a bellwether indicator of the company's overall management success. An essential feature behind unified communications is the ability to have a single way for reaching an employee. Thus, in a fully configured unified communications environment, all messages to an employee, regardless of the format of their origin (e.g., e-mail) will reach the employee at the earliest possible moment via another format (e.g., SMS) if necessary.

Unified communications may include the integration of real-time communication services (e.g., instant messaging) with non-real time communication services (e.g., SMS). Unified communications systems typically comprise not a single system but the integration of data from a potentially unlimited set of separate communications devices and systems.

As a further representative example, unified communications permits one party (e.g., a co-worker) to send a message on one medium and have it received by another party on another medium. This process effectively transfers an activity from one communications medium to another. For example, a message recipient could receive an e-mail message from a co-worker and access it through a mobile phone.

Unified communications has analogs in the home consumer market as well. A home user may want to watch a television program or surf the Internet uninterrupted, provided, for example, that an incoming message is from anyone other than a specific person. The home user may be able to control devices (e.g., a wired telephone) associated with the home cable network to implement the desired message routing.

Presence information refers to the combination of the availability of a communication recipient to be able to receive a message and that person's willingness to communicate. For example, if the message sender is online according to the presence information and currently accepts calls, the response can be sent immediately through text chat or video call. Otherwise, the communication may be sent as a non real-time message that can be accessed through a variety of media. Thus, presence information typically represents a status indicator that conveys ability and willingness of a potential communication partner.

A useful element in instant messaging and UC systems is the presence indicator associated with the names of one's collaborators. This information lets a user know if a person is present and available for communication. However, the accuracy of presence indicators is often very imprecise and sometimes completely inaccurate. Among other things, it would be useful for a presence information management system to autonomously know if a person has walked away from his/her computer and/or whether the person is even looking at the screen of his/her computer or mobile device.

Difficulties arise in synthesizing the background data related to a user's present tasks and situation. For example, some prior art systems determine if a user is "present" at his computer based upon a maximum time lag between key clicks on the user's keyboard. But the presence of key clicks does not necessarily mean that the user is available for communication, and more importantly, the absence of key clicks does not necessarily mean that the user is away from his computer. For example, the user might not be typing because he is presently reading something such as an on-line article. In other words, the user is working but is still available to receive an incoming message. Moreover, this particular user may not only be available to receive an incoming message, he may also be facing his computer, which provides a number of possible methods for reaching the user.

Many prior art systems rely upon the user to affirmatively make presence status information known to the communications system. This means that in some cases, the user is actually present but last updated his status when he wasn't—while in other cases, the user is actually not present but last updated his status when he was present. This renders the reliability of user-entered presence data prone to all types of possible error. Accordingly, unified communications systems typically prefer to determine a user's status automatically without requiring user intervention.

As an analogous problem, conventional 3D viewing systems, such as 3D video systems, often use glasses with a variety of different technologies to permit the viewer to perceive the three-dimensional (3D) effect. However, these systems typically perform poorly when the viewer views the 3D video display from an off-axis angle to the device's viewing screen. These viewing systems have limited capabilities for making corrections and adjustments based on viewer movement, positioning, and re-positioning.

Attempts to solve these problems in the prior art have tended to be either overly complicated, overly expensive, or both. For example, one of the preferred solutions in the prior art has been to use keyboard and mouse activity to sense if the user is at a given device (e.g., his computer) or not by using inactivity timeouts that last for several minutes. Some recent prior art solutions use Don/Doff sensors in a headset or an RF link with received signal strength indicator (RSSI) measurements to determine whether the user is near a given device (e.g., near his computer or wearing a headset), but none of these prior art systems can determine if the user is in front of a given device (e.g., a computer display) or if the user is looking at the device or looking away from it. The inability of present systems to readily provide this information to unified communications presence management systems complicates the successful adoption of unified communications systems as a whole because it limits the robustness of the responses that such systems can have to changing user circumstances. Similarly, the inability to determine how a viewer is positioned with respect to his 3D viewing device also complicates the successful adoption of 3D viewing systems as a whole because it also limits the robustness of the responses that such systems can have to changing user circumstances and conditions.

SUMMARY OF THE INVENTION

Embodiments of the invention provide a proximity determination system. The system comprises a light source configured to generate an illumination pattern comprising light having at least two different intensity characteristics, wherein the light source is positioned in the proximity of a first object. A light detection device is configured to measure the illumination pattern comprising light having at least two different intensity characteristics, wherein the light detection device is positioned in the proximity of a second object. A processor configured to receive the measured illumination pattern from the light detection device and determine if the second object is in proximity of the first object. In some embodiments of the invention, the first object is a monitor and the second object is a user of the monitor. In still other embodiments of the invention, the first object is a monitor on a mobile phone and the second object is a user of the mobile phone. In yet another embodiment of the invention, the first object is a 3D viewing device and the second object is a user of the device.

Embodiments of the invention provide a method for determining proximity between a first object and a second object. The method comprises generating a light illumination pattern from a light source that comprises light having at least two different intensity characteristics, wherein the light source is positioned in the proximity of the first object. The method also comprises measuring the illumination pattern received from the light source by a light detection device configured to measure the illumination pattern according to at least two different intensity characteristics, wherein the light detection device is positioned in the proximity of the second object. The measured illumination pattern from the light detection device is received by a processor that determines if the second object is in the proximity of the first object. In some embodiments of the invention, the first object is a monitor and the second object is a user of the monitor. In still other embodiments of the invention, the first object is a monitor on a mobile phone and the second object is a user of the mobile phone. In yet another embodiment of the invention, the first object is a 3D viewing device and the second object is a user of the device.

DETAILED DESCRIPTION OF AN EMBODIMENT OF THE INVENTION

Embodiments of the invention enable a system and method that can determine if a user in a communication system has his head facing towards or away from a device, such as a display device. This information may then be processed by a unified communications presence management system which can adapt its responses accordingly.

Embodiments of the invention may also calculate information regarding the tilt and rotation of the user's head. This information may be applied to a variety of applications from unified communications to ergonomic systems to improvements to 3D viewing systems. In some embodiments of the invention, information about the user's head tilt and rotation may be provided to a unified communication presence management system. In further embodiments of the invention, the head position data may be recorded over a long period of time (e.g., several hours or one working day) and the data may be used to supplement or enhance other ergonomic data (e.g., "your head is tilted downward at 60 degrees for 70 percent of the day. This indicates that your ergonomic set-up could be improved.") In still further embodiments of the invention, the user's head tilt and rotation information may be provided to a 3D viewing system to improve the 3D viewing experience provided to the user.

Embodiments of the invention may be deployed on a variety of platforms, such as UC headsets used in conjunction with computer terminals and mobile phones. Embodiments of the invention may also be used with unified communications (UC) systems designed to handle advanced presence information. Embodiments of the invention may also be used with 3D viewing systems and enhanced glasses for viewing 3D images.

Experiments have shown that a single light source, such as a single infrared LED, can sometimes be helpful in detecting whether a user is near an object, such as a computer monitor. However, this approach has not proven reliable or robust because, among other things, the correlation between distance and intensity is poor, due in large measure to calibration issues.

Figure 1A:
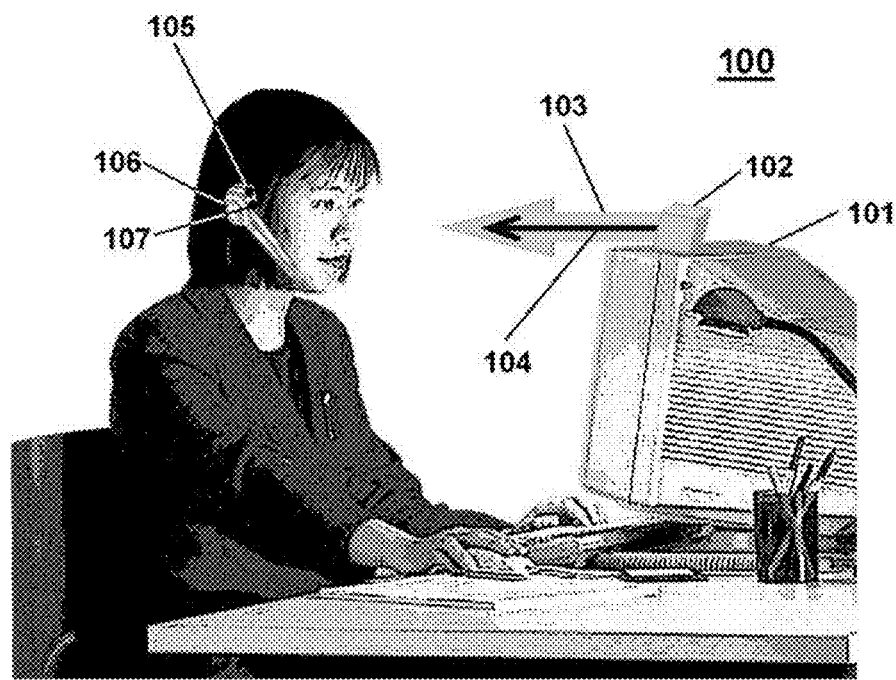
FIGS. 1A and 1B illustrate a system 100 that comprises a light source device 102 that generates an illumination pattern whose detection by detectors 105, 107 on the headset 106 indicates that the device wearer is facing the display 101, according to an embodiment of the invention.
Figure 1B:
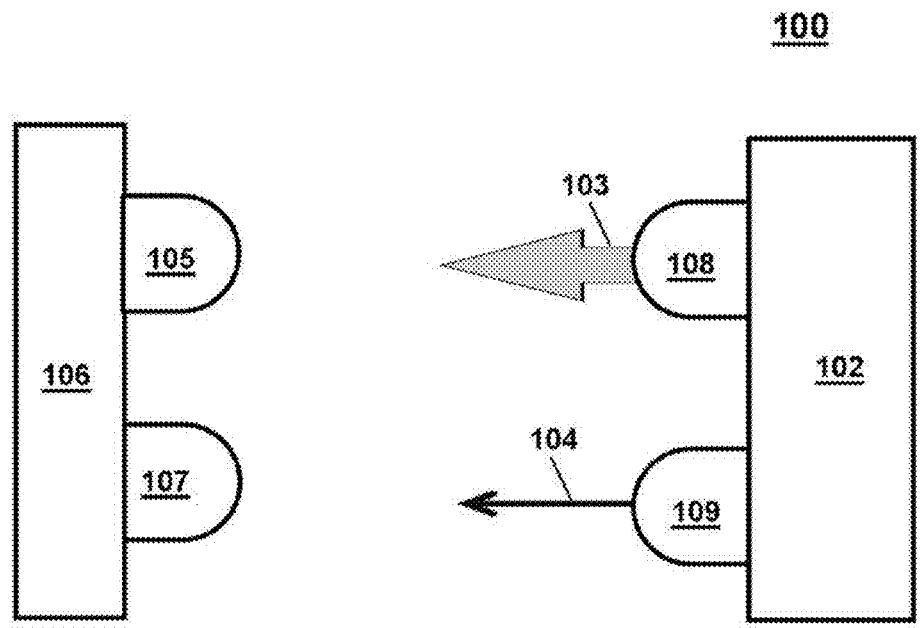

FIGS. 1A and 1B illustrate a system 100 that comprises a light source device 102 that generates an illumination pattern whose detection by detectors 105, 107 on the headset 106 indicates whether the device wearer is facing the display 101, according to an embodiment of the invention.

As shown in FIG. 1B, the light source device 102 comprises two LEDs 108, 109, according to an embodiment of the invention. The LED 108 provides a diffuse light pattern 103 and the LED 109 provides a narrow light pattern 104 in this embodiment of the invention. The light source device 102 includes a capability for calibrating intensities for each LED's 108, 109 respective light source 103, 104 both in absolute terms and with respect to each other at the center of an illumination pattern, such as the illumination pattern 200 shown in FIG. 2. The light source device 102 may be attached on or near the user's display 101 and faces outward in front of the display 101 and towards the user. In alternative embodiments of the invention, additional light sources may be provided beyond the two light sources discussed here. Similarly, the light source does not necessarily need to be an LED light source; other light sources having varying detectable characteristics could also be employed.

The headset 106 comprises an infrared detector 105 having a diffuse beam pattern and an infrared detector 107 having a narrow beam pattern, according to an embodiment of the invention. The headset 106 includes a capability for calibrating each IR detector 105, 107 both in absolute terms and with respect to each other, according to an embodiment of the invention. FIG. 1A illustrates the IR detector 105 above the IR detector 107 on the headset 106, although other operable configurations are possible. The two IR detectors 105, 107 should aim in the same direction that the user faces while wearing the headset 106. Alternative embodiments may employ different types of light detectors; the detectors employed should be capable of detecting whatever forms of light are provided by the light source device 102.

Figure 2:
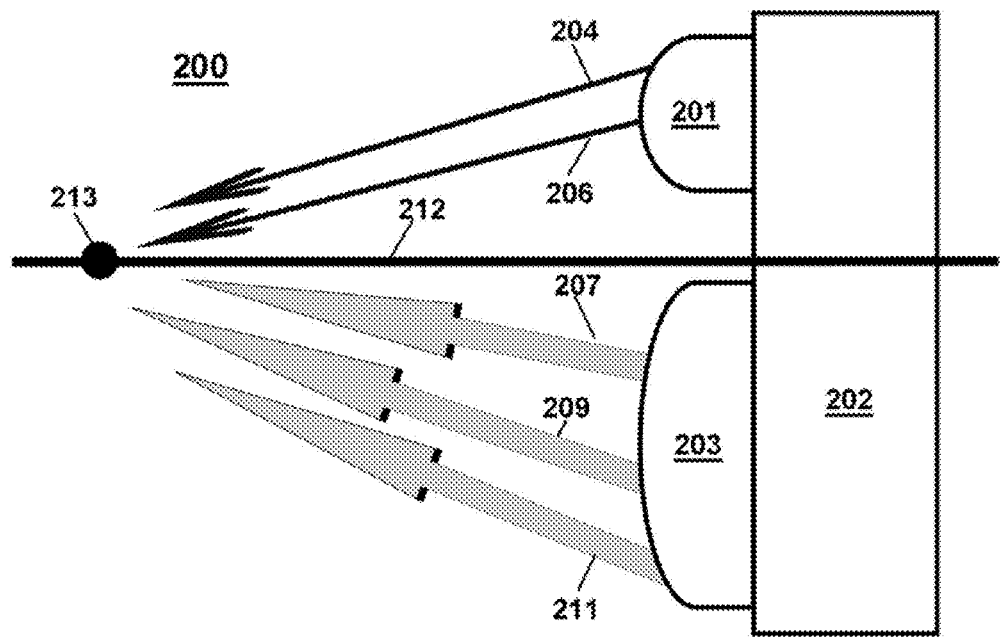
FIG. 2 illustrates an illumination pattern 200 for LEDs 201, 203 on a light source device 202, according to an embodiment of the invention.

FIG. 2 illustrates an illumination pattern 200 for LEDs 201, 203 on a light source device 202, according to an embodiment of the invention. The illumination pattern 200 generated by the light source device 202 shows an uneven pattern for the LEDs 201, 203. The LED 201 produces a narrow light beam, and the LED 203 produces a diffuse light beam. In the illumination pattern 200, the light source device 102 instructs the narrow beam LED 201 to send a first narrow beam 204 and a second narrow beam 206, according to an embodiment of the invention. After pausing briefly, the light source device 202 instructs the broad beam LED device 203 to send a first diffuse beam 207, then a second diffuse beam 209, and then a third diffuse beam 211, according to an embodiment of the invention. After a long pause, the light source device 202 instructs the LEDs 201, 203 to repeat the illumination pattern 200. The beams 204, 206, 207, 209, 211 are shown in FIG. 2 in a time sequence with the earliest beam 204 at the top and the last beam 211 at the bottom. In a physical embodiment, for example, the beam 206 would not be next to the beam 204 in a physical sense but in a time sense. The beams 204, 206 may overlap in the physical space. The beams 204, 206, 207, 209, 211 would typically be aimed at a focus point 213 along a center line 212. The center line 212 should likely correspond to a line from the center of the light source device 202 to the center of the light receiving device on the headset (e.g., the light receiving devices 105, 107 on the headset 106 shown in FIG. 1A). The center point 213 should likely correspond with the location of light receiving devices (e.g., the light receiving devices 105, 106) on the headset (e.g., the headset 106). Determination of the center point 213 may form a portion of an initialization period prior to use. Note also that the terms "diffuse" and "broad" are used herein interchangeably.

The illumination pattern 200 provides information in the form of light beams for each of the LED detectors (e.g., the light detectors 105, 107 shown in FIG. 1B) to determine which, if any, light has been detected. Other illumination patterns are possible within the spirit of the invention. An acceptable illumination pattern should combine repeating sequences comprised of repeated instances of both narrow and broad IR beams.

Figure 3:
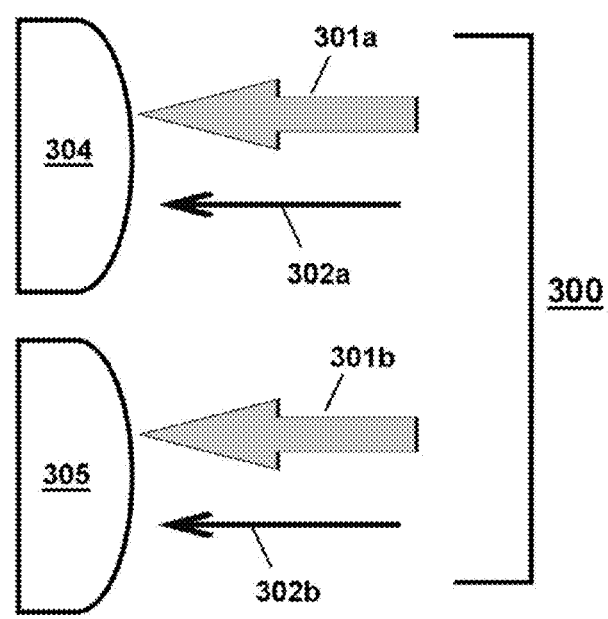
FIG. 3 illustrates receipt of an illumination pattern 300 by a diffuse beam IR detector 304 and a narrow beam IR detector 305, according to an embodiment of the invention.

FIG. 3 illustrates receipt of an illumination pattern 300 by a diffuse beam IR detector 304 and a narrow beam IR detector 305, according to an embodiment of the invention. The IR detectors 304, 305 are configured to receive the narrow and broad illumination beams provided by broad and narrow beam LEDs, such as the LEDs 108, 109 shown in FIG. 1B. The measured intensity from the broad beam LED (e.g., the LED 108 shown in FIG. 1B) by the diffuse beam IR detector 304 provides a base line estimate of the distance between the LED and the IR detector.

Figure 4:
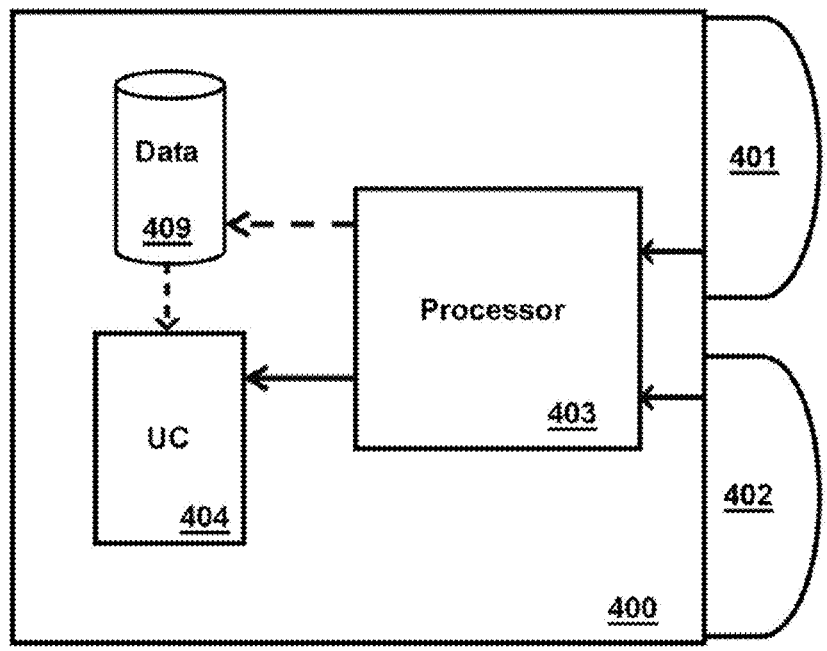
FIG. 4 illustrates a processor 403 configured to receive data from a diffuse beam IR detector 401 and a narrow beam IR detector 402, according to an embodiment of the invention.

FIG. 4 illustrates a processor 403 configured to receive data from a diffuse beam IR detector 401 and a narrow beam IR detector 402 in a communication device 400, according to an embodiment of the invention. The processor 403 may receive measurements from the IR detectors 401, 402, such as intensity data needed to calculate a base line distance estimate between an LED (e.g., the LED 109 shown in FIG. 1B) and the IR detector 401. The communication device 400 may comprise equipment such as a headset or glasses adapted for viewing 3D images.

The processor 403 is configured to calculate the ratio $R_1$ of measured intensity from a narrow beam LED (e.g., the LED 201 shown in FIG. 2) compared to a broad beam LED (e.g., the LED 203 shown in FIG. 2), as measured by the diffuse beam detector 401. This ratio $R_1$ of measured intensity provides an estimate of how far off axis the device 400 is with respect to the center line associated with the light source (e.g., the center line 212 shown in FIG. 2). If the light source and the device 400 have been properly initialized, this provides an estimate for how far off axis the user is to the user's display (e.g., the display 101 shown in FIG. 1A). Some devices may require a slight correction for this calculation where the IR detectors have been placed at a position towards a side of the user's head as opposed to residing in the center of the user's head.

The processor 403 is also configured to calculate the ratio of measured intensity of the narrow beam IR detector 402 to the diffuse beam detector 401. The calculated ratio $R_2$ provides an estimate of the user's head orientation with respect to the light source device. If the light source and the device 400 have been properly initialized, this provides an estimate for the orientation of the user with respect to the user's display (e.g., the display 101 shown in FIG. 1A). In other words, $R_2$ provides an estimate as to whether the user is looking at the display (e.g., the display 101 shown in FIG. 1A) or away from the display.

Application of a ratio of measures provides a reliable calibration of measured intensities from the broad/narrow beam LEDs because the same calibration setup is used to calibrate both LEDs and both detectors.

The ratios $R_1$ and $R_2$ provide information about the user's orientation with respect to the user's display and whether the user is facing the display or not. The processor 403 calculates the ratios $R_1$ and $R_2$ to determine an orientation for the user. In an embodiment, the processor 403 may simply make a binary determination (e.g., "yes" or "no") as to whether the user is facing the display or whether the user is in proximity of the display. In another embodiment, the processor 403 may calculate various degrees of orientation for the user's position.

The processor 403 provides results from its calculations to an appropriate system, such as a unified communications presence management device 404. The UC device 404 may use the information in a variety of ways consistent with the overall goals for the UC system. While UC 404 is shown in FIG. 4 as being part of the headset 400, the UC 404 need not necessarily be located in the headset 400. For example, the UC 404 may be located in another device that has the ability to receive the information calculated by the processor 403. In an alternative embodiment, for example, the processor 403 may store its calculations in a data repository 409. (This alternative embodiment is marked by the dashed lines in FIG. 4, which is an embodiment that need not necessarily include the UC 404.) In such an embodiment, the data repository 409 may then provide its data to the UC 404 as needed. The data computed by the processor 403 and provided to the UC 404 and/or the data repository 409 may also be provided to an ergonomic analysis system (not shown in FIG. 4). When operated for a long period of time (e.g., a working day), the processor 403 will produce position and posture data regarding the user and the user's orientation with respect to his/her computing devices that may be helpful in providing the user with a safer and more ergonomic set-up. The UC 404 could also include a device for improving the performance of a 3D viewing system.

The processor 403 may comprise a computing device such as a CPU or a computing chip in some embodiments of the invention. In other embodiments of the invention, the processor 403 may comprise a fairly simple circuit configured to perform the calculation of ratios $R_1$ and $R_2$ and report these measurements to an appropriate system. The processor 403 may also comprise a portion of another system, such as the UC 404 in some embodiments of the invention.

Figure 5:
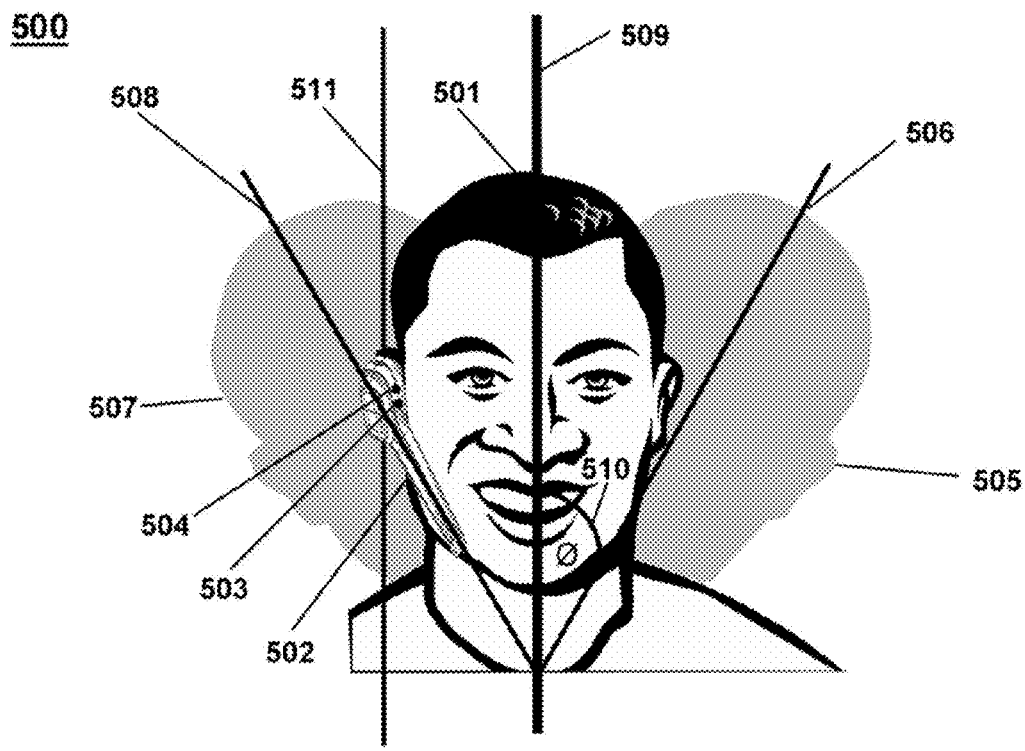
FIG. 5 illustrates a set of measurements of a user's head orientation that could be undertaken by a system 500 that includes a headset 502 having a first narrow beam sensor 503 and a second broad beam sensor 504, according to an embodiment of the invention.

FIG. 5 illustrates a set of measurements for a user's head orientation that could be undertaken by a system 500 that includes a headset 502 having a first narrow beam sensor 503 and a second broad beam sensor 504, according to an embodiment of the invention.

A user may tilt his/her head 501 at some distance off a centerline 509. The user's possible head tilt Ø 510 is shown by shadowed heads 505, 507, with each possible head tilt having its respective center 506, 508. Of course, at some high degree of head tilt, light from the light source will no longer be detectable by the light sensors 503, 504 on the headset 502.

The centerline 509 runs through the user's nose, and the headset 502 typically attaches next to the user's ear. Thus, the distance between the user's centerline 509 and the instrument for measuring tilt, the headset 502, are typically offset by a small distance that may require some compensation for certain precise measurements. A head set centerline 511 would typically correspond to a centerline for a light source that generates light for detection by the detectors 503, 504, such as the centerline 212 shown in FIG. 2.

As discussed above, the processor 403 is configured to calculate the ratio $R_1$ of measured intensity from a narrow beam LED compared to the broad beam LED, as measured by the diffuse beam sensor 504. This ratio $R_1$ of measured intensity provides an estimate of how far off axis the headset is with respect to a center line of the light source and acts as a proxy for estimating how far off axis the user is with respect to the display (e.g., the display 101 shown in FIG. 1A). As mentioned, some headset devices may require a slight correction for this calculation where the IR detectors have been placed at a position towards a side of the user's head as opposed to residing in the center of the user's head. Likewise, some glasses used in 3D viewing systems may also require slight correction if the IR detectors have been placed in a location different than the center of the user's head.

Figure 6:
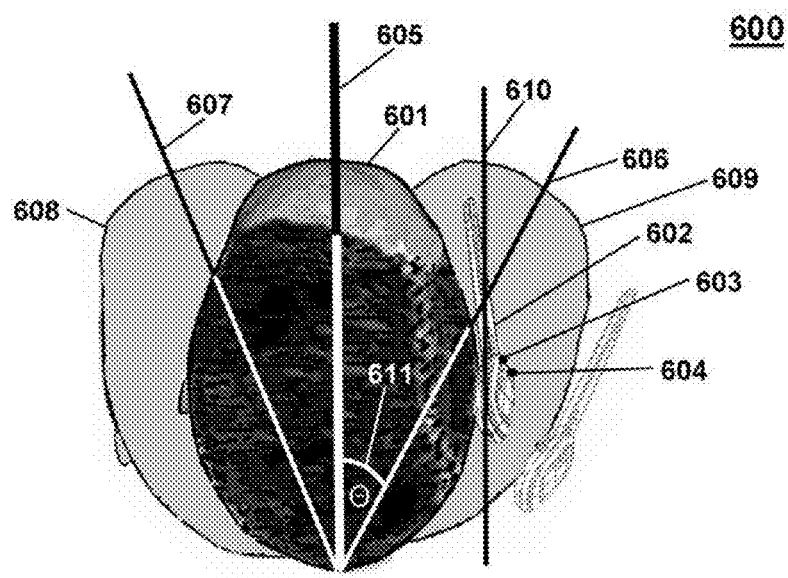
FIG. 6 illustrates a set of measurements of a user's head orientation that could be undertaken by a system 600 that includes a headset 602 having a first narrow beam sensor 603 and a second broad beam sensor 604, according to an embodiment of the invention.

FIG. 6 illustrates a set of measurements for a user's head orientation that could be undertaken by a system 600 that includes a headset 602 having a first narrow beam sensor 603 and a second broad beam sensor 604, according to an embodiment of the invention.

In an upright position, a user's head 601 may reside along a centerline 605. The centerline 605 would typically align with a centerline associated with the user's monitor (e.g., the monitor 101 shown in FIG. 1). As previously discussed, the user's monitor should include a light source device (such as the light source device 102 shown in FIG. 1A) that itself has a centerline that aligns with a centerline 610 that runs through the headset 602. The centerline 605 may be offset somewhat from the centerline 610. (The processor 403 shown in FIG. 4 may need to account for some of this offset in performing its calculations.) Similarly, accounting for this offset may also comprise a portion of the initialization procedures for the headset 602.

A user may rotate his head 601 at some distance off a centerline 605 while still allowing one or both of the sensors 603, 604 to receive light from the light source device. Thus, the presence of the user may still be recorded. The user's possible head rotation ⊖ 611 is shown by shadowed heads 608, 609, with each possible head rotation having its respective center 607, 606. Of course, at some large degree of head rotation, light from the light source will no longer be detectable by the light sensors 603, 604 on the headset 602, and the processor (e.g., the processor 403 shown in FIG. 4) will likely conclude that the user is not facing the monitor.

The system 600 may be configured to measure more than merely whether the user is facing the monitor or not as judged by the receipt or non-receipt of light. The system 600 may also be configured to provide a relatively precise indication of the user's head rotation as well, according to an embodiment of the invention.

As discussed above, the processor 403 is configured to calculate the ratio $R_2$ of measured intensity from a narrow beam IR detector 603 to the diffuse beam IR detector 604. This ratio $R_2$ of measured intensity provides an estimate of the rotation of the headset 602 with respect to the light source (e.g., the light source 102 shown in FIG. 1A). The ratio $R_2$ serves as a proxy for estimating the rotation of the user's head 601 with respect to the user's monitor (e.g., the monitor 101 shown in FIG. 1A).

Figure 7:
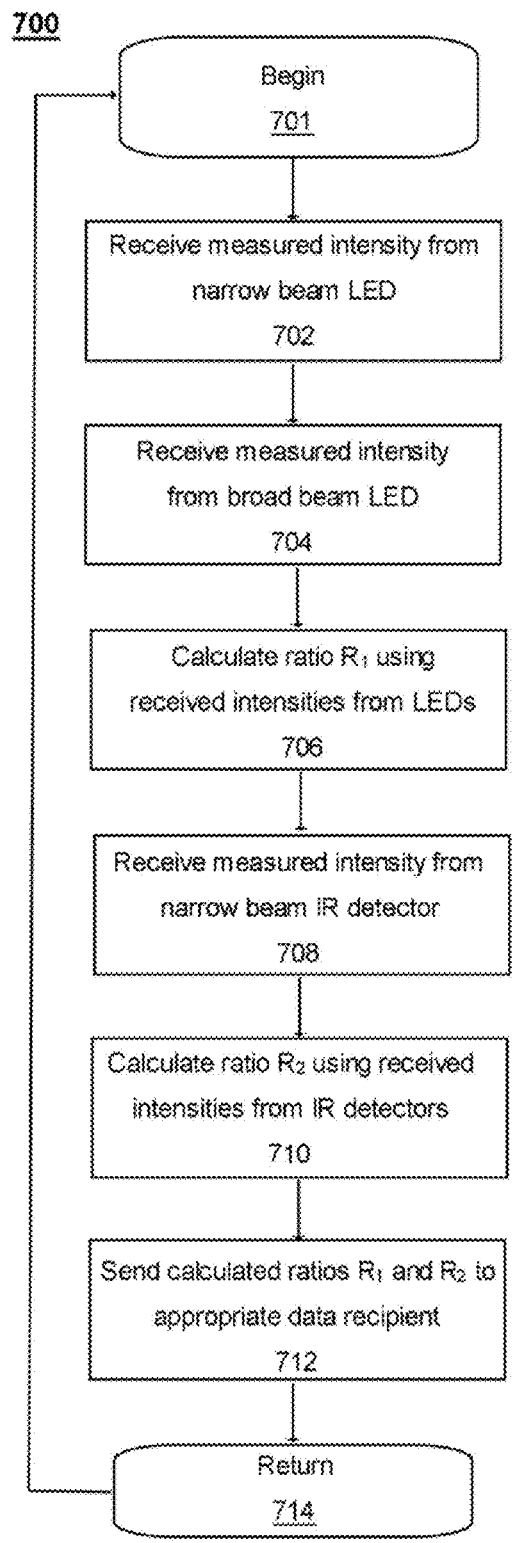
FIG. 7 provides a flowchart 700 that illustrates the steps performed by a processor (e.g., the processor 403 shown in FIG. 4) associated with light sensors (e.g., the light sensors 401, 402), according to an embodiment of the invention.

FIG. 7 provides a flowchart 700 that illustrates the steps performed by a processor (e.g., the processor 403 shown in FIG. 4) associated with light sensors (e.g., the light sensors 401, 402), according to an embodiment of the invention.

The processor receives the measured light intensity from the narrow beam LED as detected by the broad beam light sensor (e.g., the broad beam light sensor 401 shown in FIG. 4) (step 702). The processor next receives the measured light intensity from the broad beam LED as detected by broad beam light sensor (step 704). Note that in some embodiments, the processor may receive these measurements in a reverse order or may be configured to receive the measurements concurrently.

The processor next calculates the ratio $R_1$ using the received light intensities (step 706). As discussed above, the ratio $R_1$ provides an estimate for the tilt of the user's head.

The processor next receives the measured light intensities from the narrow beam IR detector (step 708). The processor has previously received the measured light intensities from the broad beam IR detector.

The processor calculates the ratio $R_2$ using the received light intensities from the IR detectors (step 710). As discussed above, the ratio $R_2$ provides an estimate for the rotation of the user's head with respect to his monitor device.

The processor then provides the calculated data, the ratios $R_1$ and $R_2$, to an appropriate recipient (step 712). As discussed above, this may be a UC presence management system and/or a data repository, according to various embodiments of the invention.

The processor then returns to the initial state (step 701) in order to prepare for receiving new measurements from its associated light detectors.

Figure 8:
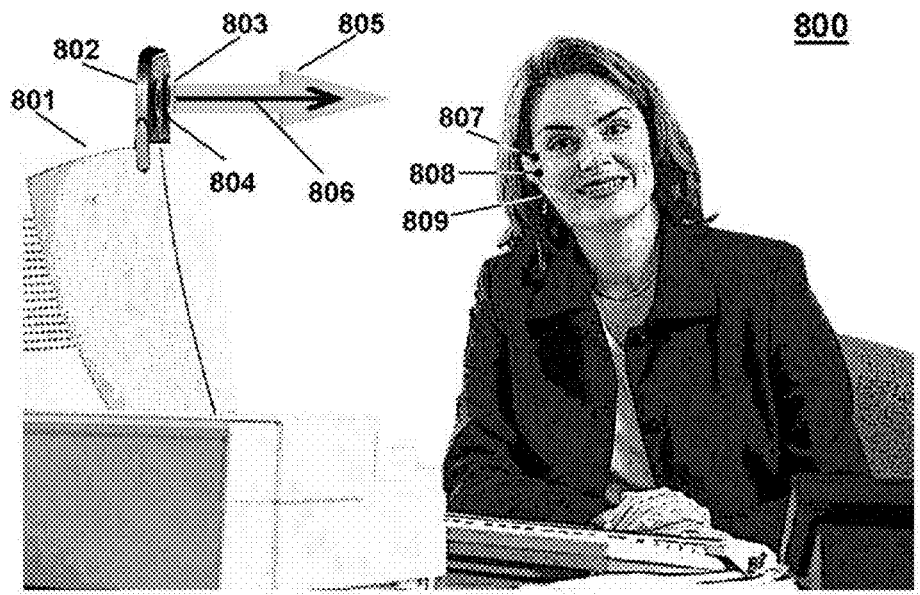
FIG. 8 illustrates a system 800 that determines that a user is facing away from a monitor 801 after the system 800 determines that the user's headset 809 faces away from a light source device 802, according to an embodiment of the invention.

FIG. 8 illustrates a system 800 that determines that a user is facing away from a monitor 801 after the system 800 determines that the user's headset 809 faces away from a light source device 802, according to an embodiment of the invention. The light source device 802 has been configured to reside on the monitor 801. The user has initialized the alignment of the light source device 802 and the headset 809.

The user wears headset 809 that has been configured to have a diffuse beam detector 807 and a narrow beam detector 808. Both detectors 807, 808 are receptive to detecting beams from the light source device 802. The light source device 802 comprises a broad beam LED 804 and a narrow beam LED 803. The broad beam LED 804 is configured to periodically emit a broad beam 805, and the narrow beam LED 803 is configured to periodically emit a narrow beam 806 in a manner consistent with an illumination pattern, e.g., the illumination pattern 200 shown in FIG. 2.

Because the user is facing away from the monitor 801, the headset 809 will likewise face away from the light source device 802. Thus, the detectors 807, 808 will not detect light from the light source device 802. An associated processor (e.g., the processor 403 shown in FIG. 4) will determine that the user is not facing the monitor 801 and provide an indication of such to an appropriate UC device (e.g., the UC device 404 shown in FIG. 4).

As mentioned above, some conventional UC systems have already been configured to detect whether the user is presently available over the UC system. For instance, the user shown in FIG. 8 might be having a conversation with a customer or co-worker and not presently be engaged in any system tasks. Imagine, for example, that the user shown in FIG. 8 has now placed her headset on the desk and left her office. In such situations, the UC system might possibly be configured to contact the user via another means such as her mobile phone. Assume, for example, that some users, such as the user shown in FIG. 8, are presently engaged in no task for which a UC system can register their presence, at least not with respect to their computing equipment and related headset. In other words, the UC system detects no key clicks on the user's keyboard, detects no movement of the user's mouse, detects no conversation on the user's headset, and also determines that the user is not facing the monitor. In such instances, the UC system may determine that the user is not "present" from a UC point of view.

Figure 9:
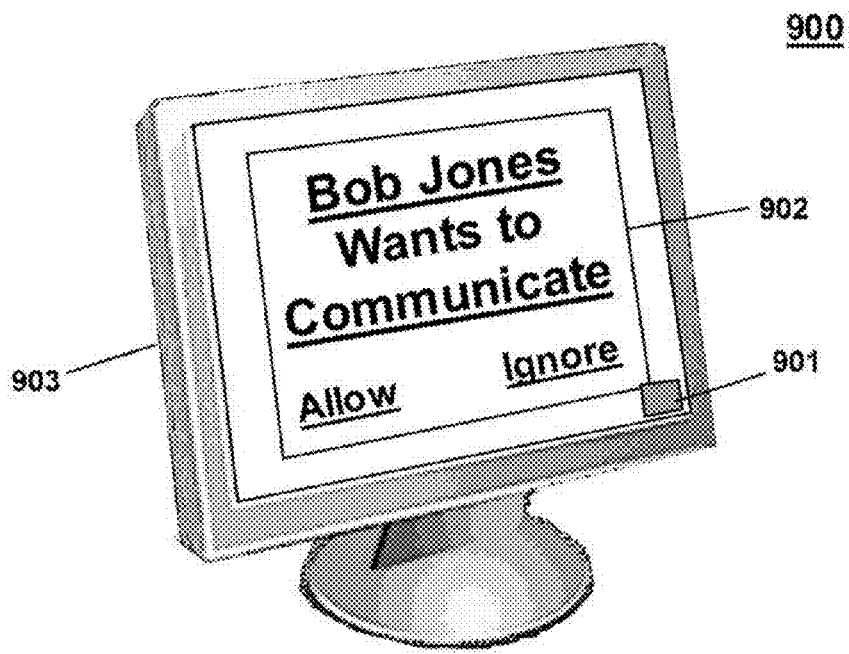
FIG. 9 illustrates a system 900 configured to present an expanded message 902 to a user who is not facing an associated monitor 903, according to an embodiment of the invention.

FIG. 9 illustrates a system 900 configured to present an expanded message 902 to a user who is not facing an associated monitor 903, according to an embodiment of the invention.

As discussed above, unified communications may take a variety of forms. One of these forms is known as instant messaging (IM). When a user is facing the monitor 903, then a message, such as an IM announcement, is conventionally fairly small in size on the monitor 903 since it assumed that the user is working at his computer and should not have his field of vision obscured unnecessarily. Message box 901 illustrates an approximate size of a conventional IM message announcement with respect to the overall size of the monitor 903. For example, on a 15 inch computer monitor, the IM message announcement is sometimes provided in a space less than an inch square.

The monitor 903 represents a system 900 in which a processor (e.g., the processor 403 shown in FIG. 4) has notified a UC presence management system (e.g., the UC 404 shown in FIG. 4) that the user is not presently facing the monitor 903. The UC system has been configured to provide the expanded message 902 in those instances where the user is facing away from the monitor 903, such as the user shown in FIG. 8. The expanded message 902 may catch the user's attention (e.g., via his/her peripheral vision) in a way that the small conventional message 901 might not catch the user's attention. In some embodiments, the expanded message 902 may be configured to flash as well as having an expanded size. A variety of alternative options are possible for how the expanded message 902 is provided to the user.

Figure 10:
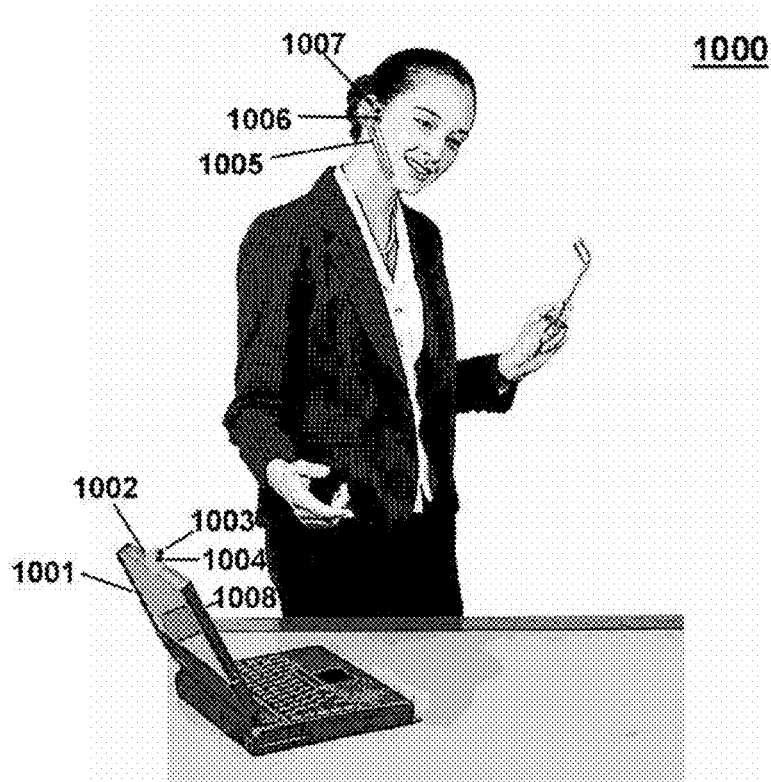
FIG. 10 illustrates a system 1000 in which a user is not facing a monitor 1001 but is otherwise engaged in a conversation using a headset 1005 and still present in the unified communications system 1000, according to an embodiment of the invention.

FIG. 10 illustrates a system 1000 in which a user is not facing a monitor 1001 but is otherwise engaged in a conversation using a headset 1005 and still present in the unified communications system 1000, according to an embodiment of the invention. In addition to the monitor 1001 and headset 1005, the system 1000 comprises a light source device 1002 that has been configured to reside on the monitor 1001.

The user wears headset 1010 that has been configured to have a diffuse beam detector 1007 and a narrow beam detector 1008. Both detectors 1007, 1008 are receptive to detecting light from the light source device 1002. The light source device 1002 comprises a broad beam LED 1004 and a narrow beam LED 1003. The broad beam LED 1004 is configured to periodically emit a broad beam, and the narrow beam LED 1003 is configured to periodically emit a narrow beam with both LEDs 1003, 1004 providing an illumination pattern consistent with the pattern 200 shown in FIG. 2.

Because the user speaking into the headset 1009 faces away from the monitor 1001, the headset 1009 will likewise face away from the light source device 1002. Thus, the detectors 1007, 1008 will not detect light from the light source device 1002. The processor (e.g., the processor 403 shown in FIG. 4) will determine that the user is not facing the monitor 1001 and provide an indication of such to an appropriate UC device (e.g., the UC device 404 shown in FIG. 4).

However, the user is presently engaged in a conversation that may be detected by the headset 1005, as well as other functionality associated with the system 1000. Thus, the associated UC system may be configured to determine that the user is physically present but otherwise engaged. As a consequence, the UC system may opt to send an expanded message (e.g., the expanded message 902 shown in FIG. 9) to the user's monitor 1001. The UC system may undertake other alternative actions as well consistent with the knowledge that the user is physically present in the system 1000 but not facing the monitor 1001.

Embodiments of the invention may be configured to operate with sensors other than (or in addition to) LED sources. For example, embodiments of the invention may use functions such as web cameras as sources for alternative sources of light as a proxy for detecting presence of the user with respect to the monitor.

Embodiments of the invention may also be configured for operation with systems other than laptop and desktop computing systems. For example, embodiments of the invention may work with mobile phones. Similarly, embodiments of the invention may also work with 3D viewing systems.

Figure 11A:
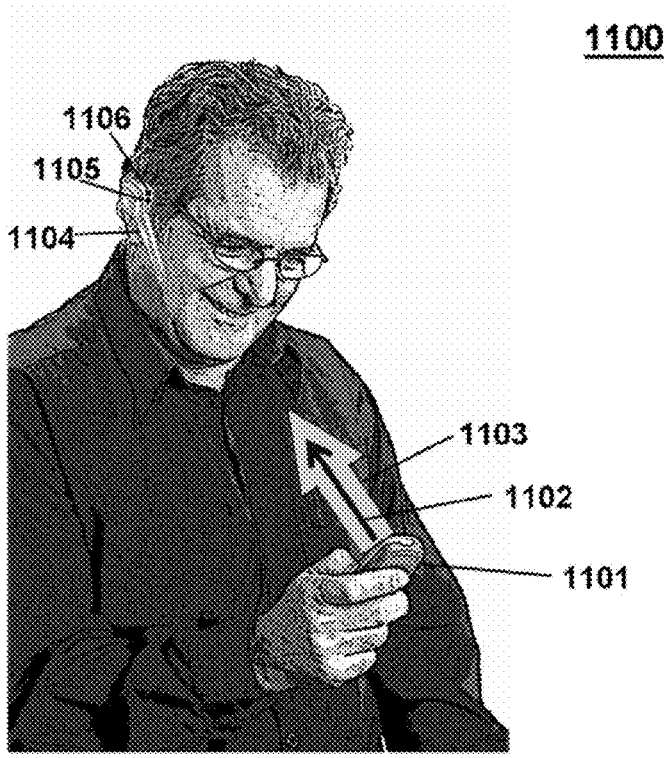
FIGS. 11A and 11B illustrate a system 1100 in which a mobile phone 1101 uses a headset 1104 to determine if the user is looking at the mobile phone 1101, according to an embodiment of the invention.
Figure 11B:
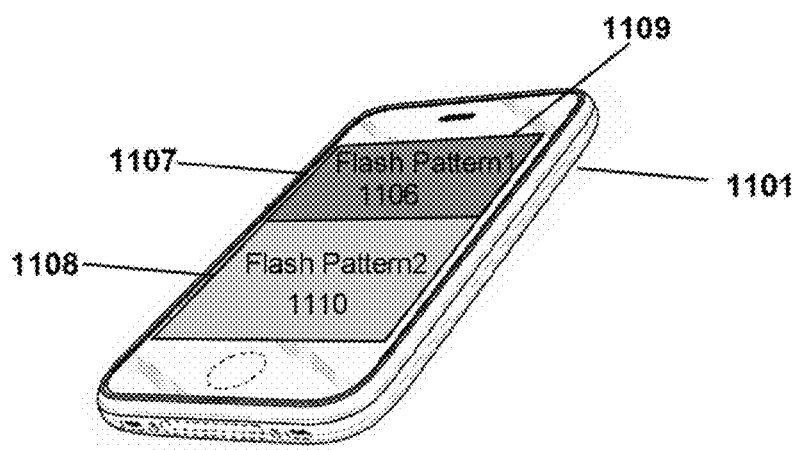

FIGS. 11A and 11B illustrate a system 1100 in which a mobile phone 1101 and a headset 1104 determine if the user is looking at the phone 1101, according to an embodiment of the invention.

A screen 1109 on the mobile phone 1101 has been divided into two sections, 1107 and 1108. In a manner analogous to the two LEDs 108, 109 shown in FIG. 1B, the two sections 1107, 1108 likewise have certain similarities. Each screen section has an ability to flash the screen with varying patterns and intensities. The first screen section 1107 flashes according to a Flash Pattern 1 1106, and the second screen section 1108 flashes according to a Flash Pattern 2 1108. These flash patterns can be designed in a variety of ways, but preferably they will flash in patterns that are not detectable by the human eye and in patterns that will cause no injury to the human eye.

The headset 1104 comprises two sensors 1105, 1106 that have been designed to detect the flash patterns 1106, 1110 emitted by the screen portions 1107, 1108. One of the sensors 1105 is designed to detect more focused light than the other sensor 1106 which detects more diffused light patterns.

In a manner similar to the system 100 disclosed in FIGS. 1A and 1B, the headset 1104 includes (or has access to) a processor (such as the processor 403 shown in FIG. 4) that can calculate a ratio $R_3$ of measured intensity from the narrow beam screen portion 1107 compared to the measured intensity from the broad beam screen portion 1107 measured by the diffuse beam detector 1105. This ratio $R_3$ of measured intensity provides an estimate of how far off axis the user is with respect to the center line in front of the display (e.g., the display 101 shown in FIG. 1A). Some headset devices may require a slight correction for this calculation where the screen display detectors have been placed at a position towards a side of the user's head as opposed to residing in the center of the user's head.

Like the processor 403 shown in FIG. 4, the processor is also configured to calculate the ratio $R_4$ of measured intensity of the narrow beam screen portion detector 1107 to the diffuse beam detector 1108. The calculated ratio $R_4$ provides an estimate of the user's head orientation with respect to the display 1109, such as whether the user is looking at the mobile phone 1101. The ratios $R_3$ and $R_4$ provide information about the user's orientation with respect to the mobile phone 1101 and whether the user is facing the mobile phone 1101 or not.

The processor calculates the ratios $R_3$ and $R_4$ and determines an orientation for the user. In an embodiment, the processor may simply make a binary determination (e.g., "yes" or "no") as to whether the user is facing the display 1109. In another embodiment, the processor may calculate various degrees of orientation for the user's position as discussed above.

Figure 12:
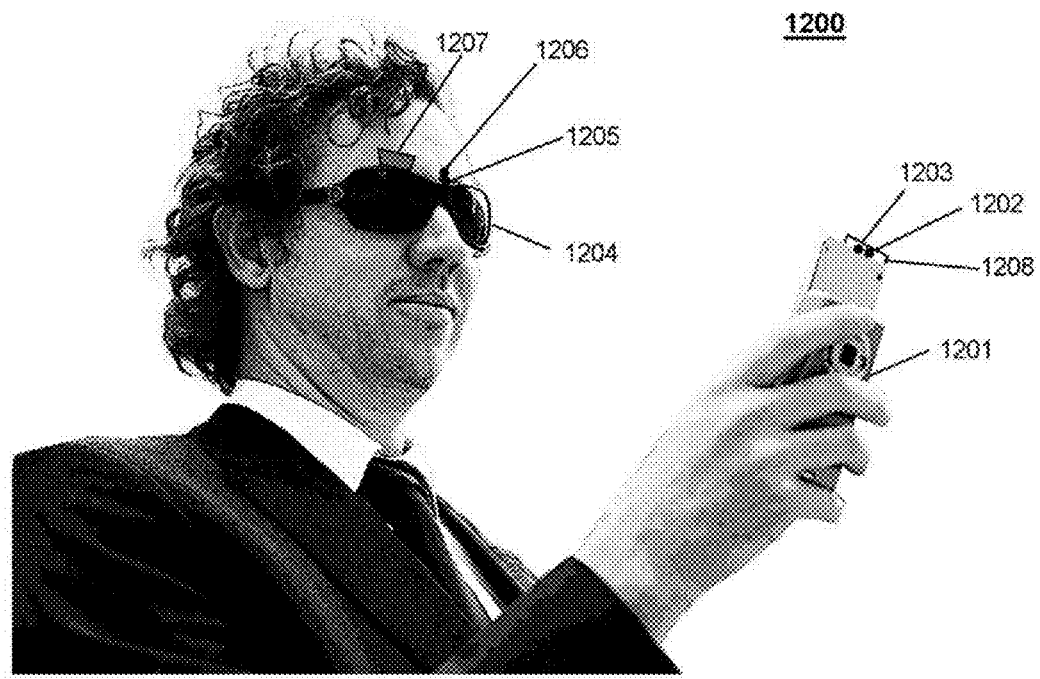
FIG. 12 illustrates a system 1200 in which a 3D display device 1201 and enhanced viewing glasses 1204 determine the orientation of the viewer with respect to the 3D display device 1201, according to an embodiment of the invention.

FIG. 12 illustrates a system 1200 in which a 3D display device 1201 and enhanced viewing glasses 1204 determine the orientation of the viewer with respect to the 3D display device 1201, according to an embodiment of the invention. Conventional 3D viewing systems often use glasses with a variety of different technologies to permit the viewer to perceive the three-dimensional (3D) effect. However, these 3D systems typically perform poorly when the viewer views the 3D display device 1201 from an off-axis angle to the device's viewing screen. The 3D display device 1201 may be configured to display videos, still images, or combinations of both. The enhanced viewing glasses 1204 comprise glasses that have been equipped to operate with the 3D display device and in some instances may have optical properties tailored for 3D applications.

Mounting a broad beam IR detector 1205 and a narrow beam IR detector 1206 on the viewing glasses 1204 in combination with a broad beam LED 1202 and a narrow beam LED 1203 on a light source device 1208 enables the system 1200 to sense how far off axis the viewer is with respect to the 3D display device 1201, according to an embodiment of the invention. Compensations can be made at either the glasses 1204 or the 3D display device 1201 once the system 1200 understands the viewer's orientation.

A processor 1207 on the glasses 1204 has been configured to calculate the ratio $R_5$ of measured intensity from the narrow beam LED 1203 compared to the measured intensity from the broad beam LED 1202 as measured by the broad beam IR detector 1205 in a manner similar to the system 100 disclosed in FIGS. 1A and 1B, according to an embodiment of the invention. This ratio $R_5$ of measured intensity provides an estimate of how far off axis the user is with respect to a center line in front of the 3D display device 1201. Some processors may require a slight correction in this calculation where the detectors 1205, 1206 have been placed at a position towards a side of the user's head as opposed to residing in the center of the user's head.

The processor 1207 is also configured to calculate the ratio $R_6$ of measured intensity of the narrow beam IR detector 1206 to the broad beam IR detector 1205. The calculated ratio $R_6$ provides an estimate of the user's head orientation with respect to the 3D display device 1201. The ratios $R_5$ and $R_6$ provide information about the user's orientation with respect to the 3D display device 1201.

The processor 1207 calculates the ratios $R_5$ and $R_6$ and determines an orientation for the user. In some embodiments, the processor 1207 may simply make a binary determination (e.g., "yes" or "no") as to whether the user is properly facing the 3D display device 1201. In some other embodiments, the processor 1207 may calculate various degrees of orientation for the user's position as discussed above with respect to other embodiments. The processor 1207 can provide its calculations to a 3D adjustment device (not shown) on the glasses 1204 that makes appropriate compensation for the ratios $R_5$ and $R_6$. Alternatively, the processor 1207 can provide the ratios $R_5$ and $R_6$ to a 3D adjustment device (not shown) on the 3D display device 1201 that can make appropriate corrections. The processor 1207 could provide this information to the 3D display device 1201 using a device such as a transceiver in a manner similar to a convention headset. As another alternative, both the glasses 1204 and the 3D display device 1201 may include 3D adjustment devices that work together to provide the compensations suggested by the ratios $R_5$ and $R_6$. Measuring the viewer's head orientation with respect to the 3D display device 1201 may permit compensations to optimize the 3D viewing experience when the viewer's head is askance to the viewing screen on the 3D display device 1201.

Figure 13:
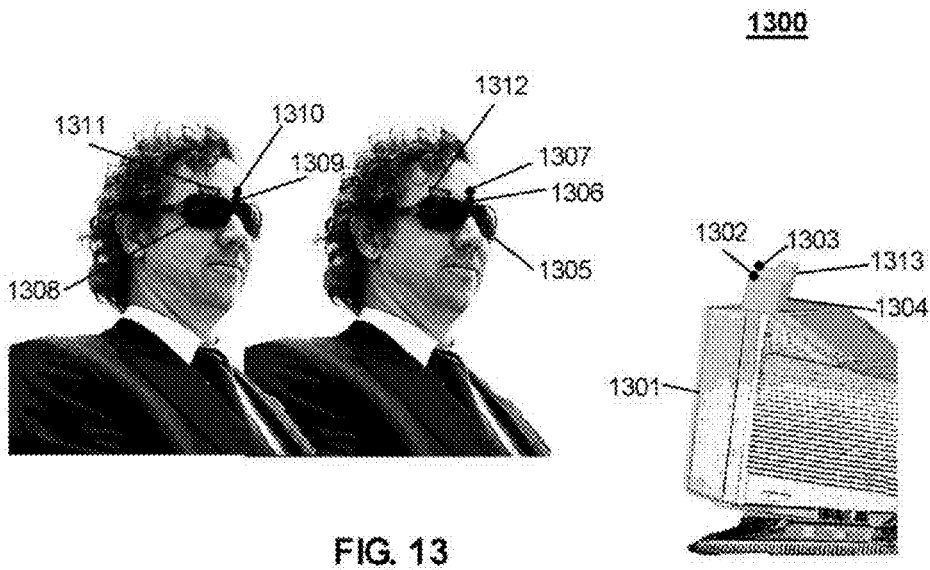
FIG. 13 illustrates a system 1300 in which a 3D viewing device 1301 and enhanced viewing glasses 1305, 1308 determine the orientation of multiple viewers with respect to the 3D viewing device 1301, according to an embodiment of the invention.

FIG. 13 illustrates a system 1300 in which a 3D viewing device 1301 and enhanced viewing glasses 1305, 1308 determine the orientation of multiple viewers with respect to the 3D viewing device 1301, according to an embodiment of the invention.

The system 1300 resembles the system 1200 shown in FIG. 12 and comprises the viewing glasses 1305, 1308 each respectively equipped with a narrow beam IR detector 1306, 1309 and a broad beam IR detector 1307, 1310, as well as processors 1311, 1312. The 3D viewing device 1301 in the system 1300 includes a light source device 1304 having a broad beam LED 1302 and a narrow beam LED 1303. The light source device 1304 also includes a face recognition device 1313. The face recognition device 1313 may comprise a variety of device types, including devices that identify faces, such as those found in conventional digital cameras, as well as devices that simply remember viewer positions at device initialization. The face recognition device 1313 acts to help the LEDs 1302, 1303 remember where different glasses 1305, 1308 are generally located and direct the LEDs 1302, 1303 to output their respective beams accordingly. The face recognition device 1313 either organically and/or in combination with other hardware acts to steer the LEDs 1302, 1303 appropriately and generate their respective beams in a repeating pattern to accommodate various user glasses 1305, 1308. Depending upon the hardware configurations employed, the system 1300 may operate with even more than two pairs of viewing glasses.

The processors 1311, 1312 operate in a manner similar to the processor 1207 shown in FIG. 12. The processors 1311, 1312 calculate corrections for their respective glasses 1305, 1308. In a manner similar to the processor 1207, the processors 1311, 1312 may communicate their calculations (e.g., respective ratios $R_5$ and $R_6$) to appropriate 3D adjustment devices on the glasses 1305, 1308 and/or to the 3D viewing device 1301. Embodiments in which the 3D viewing device 1301 itself includes a 3D adjustment device may also include a global compensation facility as part of its 3D adjustment device with the global compensation facility configured to note any uniform offsets applied to glasses 1305, 1308 which may indicate a misalignment of the light source device 1304, according to an embodiment of the invention.

In alternative embodiment of the invention, the location of the sensors and light sources may be reversed. The dual light sensors could be placed in a device associated with the monitor while the dual light sources could reside on the headset, for example. Various calculations may need appropriate adjustment if the moving portion of the system is the one generating the light source as well, as opposed to the static object having the light source.

Similarly, the light source device need not necessarily be located on a monitor, mobile phone, or 3D viewing device. The light source device could be placed on any location where it was desirable to determine if the user was facing the location. So, for example, if it was desirable for a system to know if a user was facing a particular spot, then the light source device would be located at that spot with the system subsequently processing information in one way when the user is determined to be looking at that spot and processing information in another way when the user is determined to be not looking at the spot.

In some alternative embodiments, the UC presence management system may even be configured to provide additional content to the user when the headset is in a particular alignment with respect to the measured object. The additional content could be provided when the headset was both in alignment or not in alignment with the object. In still other embodiments, the light detection devices could be emplaced in something other than a headset. For example, the devices could be placed on a hat or headband. Of course, the light detection devices would need to communicate their measurements to a processor as discussed herein.

While specific embodiments of the invention have been illustrated and described, it will be clear that the invention is not limited to these embodiments only. Numerous modifications, changes, variations, substitutions and equivalents will be apparent to those skilled in the art without departing from the spirit and scope of the invention as described in the claims.

In general, in the following claims, the terms used should not be construed to limit the invention to the specific embodiments disclosed in the specification, but should be construed to include all systems and methods that operate under the claims set forth hereinbelow. Thus, it is intended that the invention covers the modifications and variations of this invention provided they come within the scope of the appended claims and their equivalents.

I claim:

1. A proximity determination system, comprising:
A light source configured to generate an illumination pattern comprising light having at least two different intensity characteristics, the light source comprising a broad beam light source and a narrow beam light source, wherein the light source is positioned in the proximity of a first object;
A light detection device comprising a narrow beam light detector and a broad beam light detector configured to measure the illumination pattern comprising light having at least two different intensity characteristics, wherein the light detection device is positioned in the proximity of a second object associated with a user; and
A processor configured to receive the measured illumination pattern from the light detection device and determine if the second object is in proximity of the first object, wherein the processor determines if the user is facing the first object by computing a ratio of measured intensity from the narrow beam detector to the measured intensity from the broad beam detector.

2. The proximity determination system of claim 1 wherein the processor determines how far off axis the user is with respect to a centerline from the first object by computing a ratio of measured intensity from the narrow beam light source to the measured intensity from the broad beam light source as measured by the broad beam detector.

3. The proximity determination system of claim 2 wherein the first object comprises a monitor and the second object comprises a headset worn by the user and wherein the processor is further configured to send a proximity detection signal to a unified communications presence management device.

4. The proximity determination system of claim 3 wherein the unified communications presence management device directs the sending of an expanded message to the monitor based upon a determination that the user is not aligned with a centerline of the monitor.

5. The proximity determination system of claim 2 wherein the broad light source comprises an LED and wherein the narrow light source comprises an LED.

6. The proximity determination system of claim 2 wherein the broad beam detector comprises an IR detector and wherein the narrow beam detector comprises an IR detector.

7. The proximity determination system of claim 2 wherein the first object comprises a monitor and the second object comprises a headset worn by the user and wherein the processor is further configured to send collected proximity data to an ergonomic analysis system.

8. The proximity determination system of claim 2 wherein the first object comprises a mobile phone and the second object comprises a headset worn by the user and wherein the processor is further configured to send a proximity detection signal to a unified communications presence management device.

9. The proximity determination system of claim 8 wherein the broad beam light source comprises a first portion of the mobile phone display and wherein the narrow beam light source comprises a second portion of the mobile phone display.

10. The proximity determination system of claim 8 wherein the broad beam detector comprises an IR detector and wherein the narrow beam detector comprises an IR detector.

11. The proximity determination system of claim 2 wherein the first object comprises a 3D viewing device and the second object comprises enhanced glasses worn by the user and wherein the processor is further configured to send a proximity detection signal to a 3D adjustment device.

12. The proximity determination system of claim 11 wherein the broad light source comprises an LED and wherein the narrow light source comprises an LED, and wherein a face recognition device operates with the broad light source and the narrow light source to detect a proximity of a third object wherein the third object comprises enhanced glasses worn by another user.

13. The proximity determination system of claim 1 wherein the light source comprises a broad beam light source and a narrow beam light source and wherein the illumination pattern comprises two beams from the narrow beam light source followed by three beams from the broad beam light source.

14. A method for determining proximity between a first object and a second object, comprising:
   Generating a light illumination pattern from a light source that comprises light having at least two different intensity characteristics, the light source comprising a broad beam light source and a narrow beam light source, wherein the light source is positioned in the proximity of the first object;
   Measuring the illumination pattern received from the light source by a light detection device comprising a narrow beam light detector and a broad beam light detector configured to measure the illumination pattern according to at least two different intensity characteristics, wherein the light detection device is positioned in the proximity of the second object associated with a user; and
   Receiving the measured illumination pattern from the light detection device by a processor configured to determine if the second object is in the proximity of the first object wherein the processor determines if the user is facing the first object by computing a ratio of measured intensity from the narrow beam detector to the measured intensity from the broad beam detector.

15. The method of claim 14, further comprising:
   Computing by the processor a ratio of measured intensity from the narrow beam detector to the measured intensity from the broad beam detector to determine if the first object is facing the second object.

16. The method of claim 15, further comprising:
   Computing by the processor a ratio of measured intensity from the narrow beam light source to the measured intensity from the broad beam light source as measured by the broad beam detector to determine how far off axis the first object is from a centerline of the second object.

17. The method of claim 16 wherein the first object comprises a monitor and the second object comprises a headset, the method further comprising:
   Sending a proximity detection signal by the processor to a unified communications presence management device wherein the proximity detection signal indicates whether the headset is facing the monitor.

18. The method of claim 17, further comprising receiving an expanded message on the monitor based on a determination that the user is not aligned with a centerline of the monitor, wherein the unified communications presence management device has directed the sending of an expanded message to the monitor.

19. The method of claim 16 wherein the broad light source comprises a light emitting diode (LED) and wherein the narrow light source comprises a light emitting diode (LED).

20. The method of claim 19 wherein the broad beam detector comprises an IR detector and wherein the narrow beam detector comprises an IR detector.

21. The method of claim 16 wherein the first object comprises a monitor and the second object comprises a headset worn by a user, the method further comprising:
   Sending proximity data collected by the processor to an ergonomic analysis system.

22. The method of claim 16 wherein the first object comprises a mobile phone and the second object comprises a headset, the method further comprising:
   Sending a proximity detection signal by the processor to a unified communications presence management device wherein the proximity detection signal indicates whether the headset is facing the mobile phone.

23. The method of claim 22 wherein the broad beam light source comprises a first portion of the mobile phone display and wherein the narrow beam light source comprises a second portion of the mobile phone display.

24. The method of claim 23 wherein the broad beam detector comprises an IR detector and wherein the narrow beam detector comprises an IR detector.

25. The method of claim 16 wherein the first object comprises a 3D viewing device and the second object comprises enhanced glasses worn by the user, the method further comprising:
   Sending a proximity detection signal by the processor to a 3D adjustment device.

26. The method of claim 25 wherein the broad light source comprises an LED and wherein the narrow light source comprises an LED, the method further comprising:
   Detecting the proximity of a third object by controlling the broad light source and the narrow light source using a face recognition device wherein the third object comprises enhanced glasses worn by another user.

27. The method of claim 14 wherein the light source comprises a broad beam light source and a narrow beam light source and wherein the illumination pattern comprises two beams from the narrow beam light source followed by three beams from the broad beam light source.

* * * * *